(12) United States Patent
Zhong

(10) Patent No.: US 11,318,919 B2
(45) Date of Patent: May 3, 2022

(54) HIDDEN BRAKING DEVICE

(71) Applicant: Jiang-Ping Zhong, Dongguan (CN)

(72) Inventor: Jiang-Ping Zhong, Dongguan (CN)

( * ) Notice: Subject to any disclaimer, the term of this patent is extended or adjusted under 35 U.S.C. 154(b) by 315 days.

(21) Appl. No.: 16/594,236

(22) Filed: Oct. 7, 2019

(65) Prior Publication Data

US 2021/0101570 A1 Apr. 8, 2021

(51) Int. Cl.
| | |
|---|---|
| *B60T 7/10* | (2006.01) |
| *F16D 65/28* | (2006.01) |
| *F16D 49/00* | (2006.01) |
| *B60T 1/04* | (2006.01) |
| *A61H 3/04* | (2006.01) |
| *B60T 11/04* | (2006.01) |
| *F16D 121/14* | (2012.01) |
| *F16D 125/62* | (2012.01) |

(52) U.S. Cl.
CPC .............. *B60T 7/104* (2013.01); *A61H 3/04* (2013.01); *B60T 1/04* (2013.01); *B60T 11/046* (2013.01); *F16D 49/00* (2013.01); *F16D 65/28* (2013.01); *A61H 2003/046* (2013.01); *A61H 2201/0192* (2013.01); *F16D 2121/14* (2013.01); *F16D 2125/62* (2013.01)

(58) Field of Classification Search
CPC ...... F16D 2125/60; F16D 49/00; F16D 65/28; F16D 2125/62; F16D 2121/14; B60T 7/104; B60T 1/04; B60T 11/046; A61H 3/04; A61H 2003/046; A61H 2201/0192; B62B 5/04; B62B 5/0485
See application file for complete search history.

(56) References Cited

U.S. PATENT DOCUMENTS 5,575,178 A * 11/1996 Wu ........................... B62L 3/02
74/489
6,032,765 A * 3/2000 Hsi-Chia ................ B62K 23/06
135/67

(Continued)

FOREIGN PATENT DOCUMENTS

| GB | 2359350 A | * | 8/2001 | .............. B62L 3/023 |
| KR | 100986334 B1 | * | 10/2010 | |

OTHER PUBLICATIONS

English translation of KR 100986334 B1 (Year: 2009).*

*Primary Examiner* — Robert A. Siconolfi
*Assistant Examiner* — Mahbubur Rashid
(74) *Attorney, Agent, or Firm* — Karin L. Williams; Mayer & Williams PC

(57) ABSTRACT

A hidden braking device includes a brake handle, a brake member controlling a wheel set, and a connecting member disposed in a main frame having telescoping upper and lower frames. The connecting member has an upper stem connected to the brake handle and having fixing notches, a lower stem connected to the brake member, a locking set disposed on the lower frame and mainly including a locking unit, and an adjusting set connected to both stems. The adjusting set mainly has an operating unit on which a first spring unit is disposed, an engaging case and a positioning case disposed relative to each other, and an elastic unit located between both cases and engaged with the fixing notches. The first spring unit pushes the operating unit while loosening the locking unit to thereby position the engaging case and adjust a full length of the main frame quickly.

4 Claims, 10 Drawing Sheets

(56) References Cited

U.S. PATENT DOCUMENTS

| | | | | |
|---|---|---|---|---|
| 6,216,825 B1* | 4/2001 | Hung | ............... | A61H 3/04 |
| | | | | 188/19 |
| 6,647,825 B1* | 11/2003 | Lin | ............... | B60T 7/102 |
| | | | | 74/489 |
| 8,474,838 B1* | 7/2013 | Wu | ............... | B62M 1/00 |
| | | | | 280/87.041 |
| 8,931,366 B2* | 1/2015 | Wu | ............... | B60T 7/102 |
| | | | | 74/502.2 |
| 2004/0020322 A1* | 2/2004 | Hsieh | ............. | A61G 5/1035 |
| | | | | 74/502.2 |
| 2006/0237935 A1* | 10/2006 | Lonkvist | ............ | B62B 5/04 |
| | | | | 280/87.021 |
| 2007/0151400 A1* | 7/2007 | Huang | ............ | B62L 3/06 |
| | | | | 74/532 |
| 2008/0047785 A1* | 2/2008 | Huang | ............ | A61H 3/04 |
| | | | | 188/24.18 |
| 2014/0076090 A1* | 3/2014 | Tsay | .............. | B60T 11/046 |
| | | | | 74/491 |

* cited by examiner

HIDDEN BRAKING DEVICE

BACKGROUND OF THE INVENTION

1. Field of the Invention

This invention relates to a braking device and relates particularly to a hidden braking device disposed inside a frame.

2. Description of the Related Art

Referring to FIG. 1 and FIG. 1A, a conventional hidden braking device 1 includes a brake handle 11, a brake member 12 adapted to control a rotation of a wheel set A, a connecting member 13 connected to the brake handle 11 and the brake member 12, and a main frame 2 connected to the brake handle 11 and the wheel set A. The connecting member 13 is disposed inside the main frame 2 which has a lower frame 22 and an upper frame 21 sliding relative to the lower frame 22. The connecting member 13 has an upper stem 131 connected to the brake handle 11, a lower stem 132 connected to the brake member 12, and a connecting unit 133 respectively connected to the upper stem 131 and the lower stem 132. The connecting unit 133 has a hole 1331 which allows the lower stem 132 to penetrate therethrough. The upper stem 131 is fixed to the connecting unit 133 and opposite to the lower stem 132.

While adjusting a full length of the main frame 2 by expanding or contracting the upper frame 21 and the lower frame 22, the lower stem 132 slides within the hole 1331, and synchronously the upper stem 131 is moved to a proper place. While executing a braking action through the brake handle 11, the user grips the brake handle 11 to simultaneously pull the upper stem 131 upwards and allow the connecting unit 133 to become inclined in order that the hole 1331 is engaged with the lower stem 132. Therefore, the lower stem 132 can be moved with the upward movement of the upper stem 131, and further drive the brake member 12 to execute the braking action. However, the repeated braking actions cause the hole 1331 to be worn away easily and cause a size of the hole 1331 to be enlarged gradually. The enlarged hole 1331 cannot be engaged with the lower stem 132 effectively, and therefore the lower stem 132 cannot be moved by the connecting unit 133 when the connecting unit 133 is pulled upwards by the upper stem 131, and that causes the lower stem 132 cannot drive the brake member 12 smoothly to result in the ineffective braking action. Hence, the inconvenience of use is increased, and that needs to be improved.

Further, the user has to grip the brake handle 11 continuously to ensure that the brake member 12 executes the braking action uninterruptedly. When the user releases the brake handle 11, the brake member 12 is also released to stop the braking action. Thus, the braking action of the brake member 12 cannot be maintained if the user releases the brake handle 11, and that causes the inconvenience of use and also requires to be improved.

SUMMARY OF THE INVENTION

The object of this invention is to provide a hidden braking device capable of attaining a quick adjustment of a full length of a main frame and increasing the convenience of use and adjustment.

The hidden braking device of this invention comprises a brake handle, a brake member adapted to control a stop of a wheel set, a connecting member connected to the brake handle and the brake member, and a main frame disposed between the brake handle and the wheel set. The connecting member is disposed inside the main frame which has a lower frame and an upper frame sliding relative to the lower frame. The connecting member has an upper stem connected to the brake handle, a lower stem connected to the brake member, a locking set disposed on the lower frame, and an adjusting set connected to the upper stem and the lower stem. The upper stem is formed with a penetrating sliding trough allowing an insertion of the lower stem and a fixing trough with a plurality of fixing notches formed on a surface of the sliding trough. The locking set has a locking body and a locking unit pivotally connected to the locking body. The adjusting set has a fixing rod disposed on the lower frame, a main base fixed to the fixing rod, an operating unit movably disposed inside the main base and allowing insertions of the upper stem and the lower stem, a positioning case connected to the lower stem and located in the operating unit, an engaging case engaged with the positioning case, an elastic unit positioned between the positioning case and the engaging case and inserted into the sliding trough to be engaged with the fixing notches, and a first spring unit disposed on the operating unit. While adjusting a full length of the main frame, the locking unit is released to allow the first spring unit to push the operating unit to the engaging case in order to fix the lower stem. And then, the upper frame is moved by an outer force to synchronously move the upper stem, and further carry out a movement of the elastic unit caused by the engagement of the elastic unit and the fixing notches. The movement of the elastic unit is then restricted by the fixed engaging case to reduce the engaging force, and that facilitates the adjustment. Therefore, the elastic unit is forced to stay motionless in order that only the upper stem is moved. After the adjustment is completed, the locking unit is fastened to push the operating unit so as to break the engagement of the operating unit and the engaging case and release the lower stem whereby the lower stem and the upper stem can be moved simultaneously. Thus, a normal braking action can be executed through pressing the brake handle to synchronously pull the upper stem and the lower stem upwards to further stimulate the brake member. Hence, the full length of the main frame is adjusted quickly and the convenience of use is increased.

Preferably, the hidden braking device further comprises a brake control set disposed between the upper stem and the brake handle. The brake handle has a front end, a rear end opposite thereof, and a slot formed between the front end and the rear end. The rear end is movable between a neutral position, a normal braking position, and a brake locking position. The brake control set has a housing fixed to the upper frame, a shaft fixed to the housing and penetrating the slot, a securing unit disposed inside the housing, a connecting line connected to the upper stem and the housing and driven by the brake handle. The securing unit has a first limiting recess and a second limiting recess formed above the first limiting recess. The front end of the brake handle moves from the first limiting recess to the second limiting recess when the rear end of the brake handle assumes the brake locking position.

Preferably, the hidden braking device further comprises a pulley disposed on the brake handle. The connecting line passes around the pulley and then being fixed to the housing.

Preferably, the brake control set has a stem base disposed on the upper stem and connected to the connecting line and a second spring unit disposed between the stem base and the housing.

Preferably, the hidden braking device further comprises an engaging recess recessedly formed on a surface of the engaging case and a protruding part projecting from a surface of the operating unit. The protruding part is adapted to be inserted into the engaging recess when the operating unit is pushed by the first spring unit.

DETAILED DESCRIPTION OF THE PREFERRED EMBODIMENTS

Figures 1, 1A:
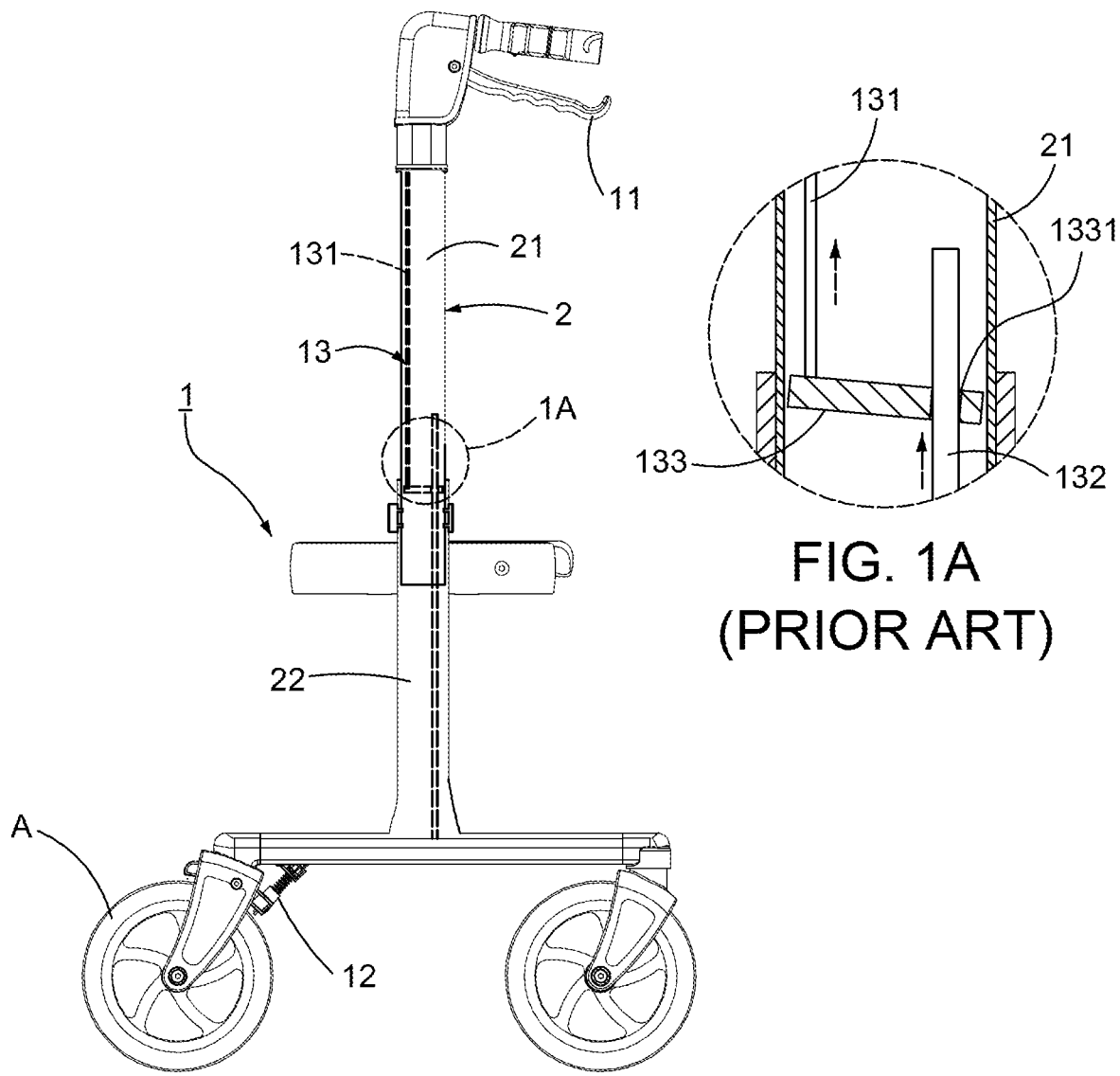
FIG. 1 is a schematic view showing a conventional hidden braking device.
FIG. 1A is an enlarged view of the encircled portion 1A indicated in FIG. 1.
Figures 2, 2A:
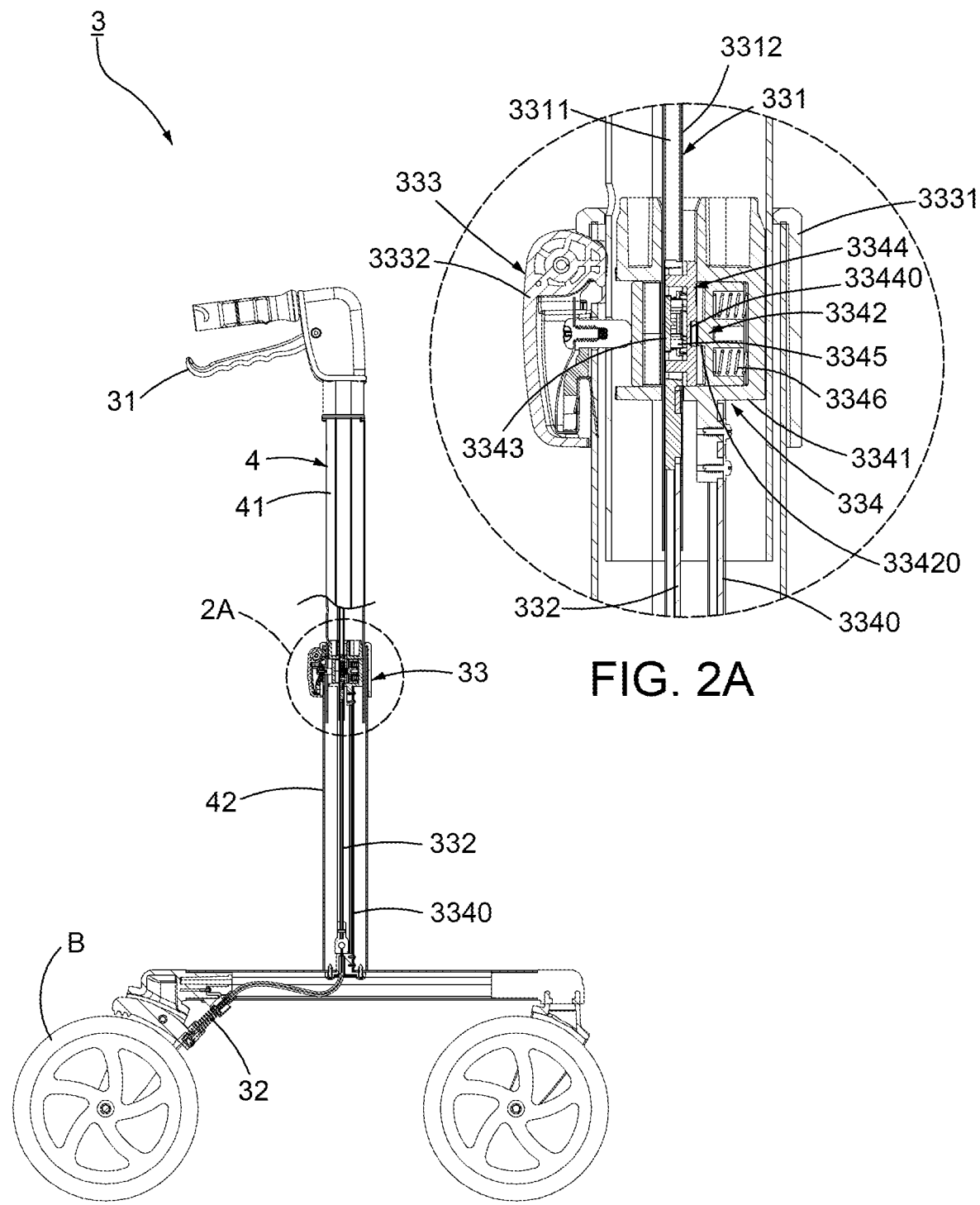
FIG. 2 is a schematic view showing a first preferred embodiment of this invention.
FIG. 2A is an enlarged view of the encircled portion 2A indicated in FIG. 2.
Figure 3:
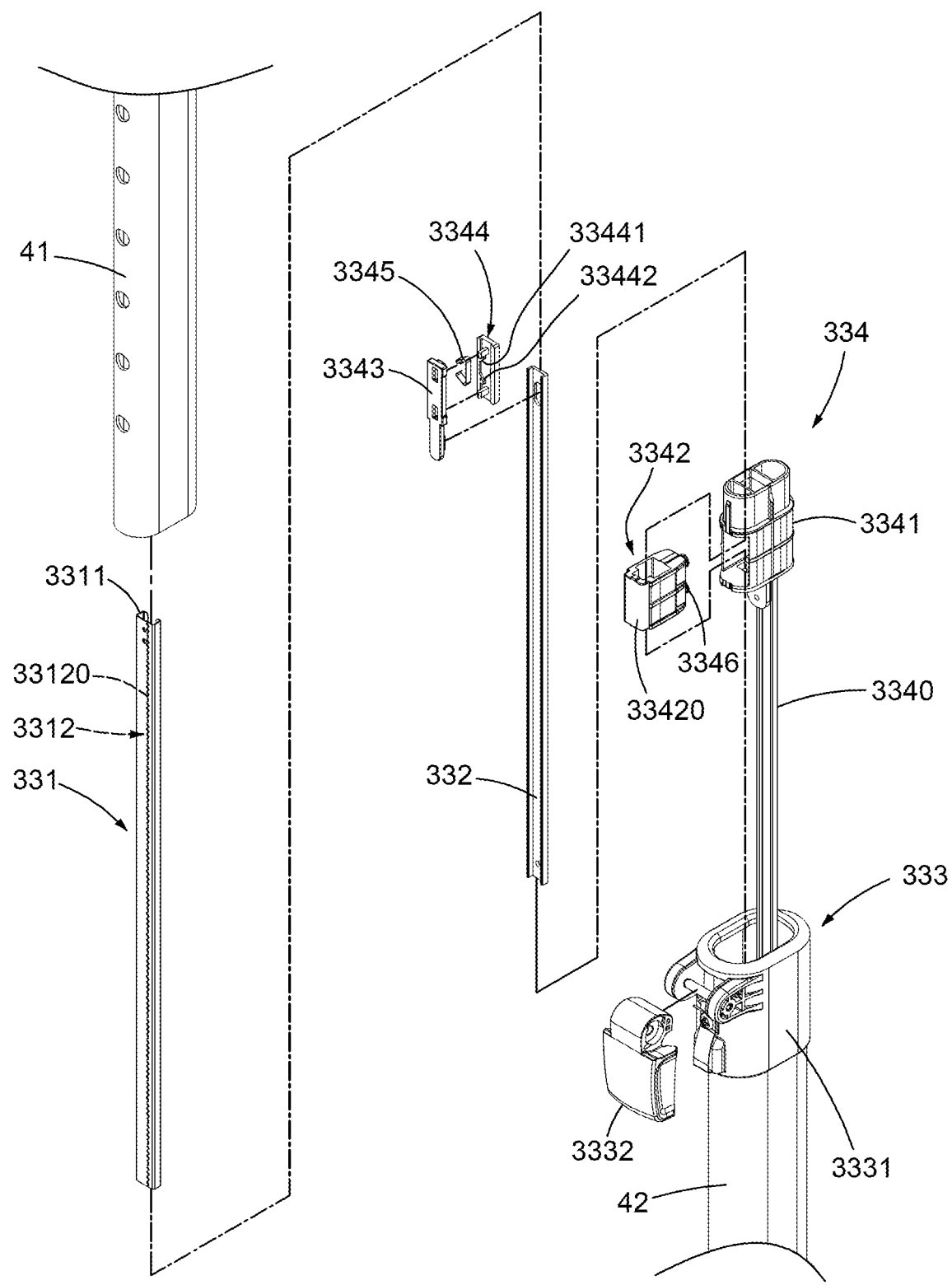
FIG. 3 is an exploded view showing the connecting member.

Referring to FIG. 2 and FIG. 2A, a first preferred embodiment of a hidden braking device 3 of this invention includes a brake handle 31, a brake member 32 adapted to control a rotation of a wheel set B, a connecting member 33 connected to the brake handle 31 and the brake member 32, and a main frame 4 disposed between the brake handle 31 and the wheel set B. The connecting member 33 is disposed inside the main frame 4 which includes an upper frame 41 and a lower frame 42. The upper frame 41 is capable of sliding relative to the lower frame 42 so that the upper frame 41 and the lower frame 42 can be expanded or contracted to attain an adjustment of a full length of the main frame 4. The connecting member 33 has an upper stem 331 connected to the brake handle 31, a lower stem 332 connected to the brake member 32, a locking set 333 fixed to an end of the lower frame 42 where the upper frame 41 is inserted, and an adjusting set 334 connected to the upper stem 331 and the lower stem 332. The upper stem 331 has a sliding trough 3311 penetrating therethrough and adapted for an insertion of the lower stem 332, and a fixing trough 3312 formed with a plurality of fixing notches 33120 formed on a surface of the sliding trough 3311 as shown in FIG. 3. Referring to FIG. 2A and FIG. 3, the locking set 333 has a locking body 3331 fixed on the end of the lower frame 42, and a locking unit 3332 pivotally connected to the locking body 3331 and capable of triggering a movement of an operating unit 3342 of the adjusting set 334. The adjusting set 334 has a fixing rod 3340 fixed to the lower frame 42, a main base 3341 fixed to the fixing rod 3340, the operating unit 3342 movably disposed inside the main base 3341 and adapted for insertions of the upper stem 331 and the lower stem 332, a positioning case 3343 connected to the lower stem 332 and located in the operating unit 3342, an engaging case 3344 located relative to the positioning case 3343, an elastic unit 3345 disposed between the positioning case 3343 and the engaging case 3344 and inserted into the sliding trough 3311 to be engaged with the fixing notches 33120, and a first spring unit 3346 disposed on the operating unit 3342 for pushing the operating unit 3342 to the engaging case 3344 in order to position the engaging case 3344 and fix the lower stem 332.

Figure 4:
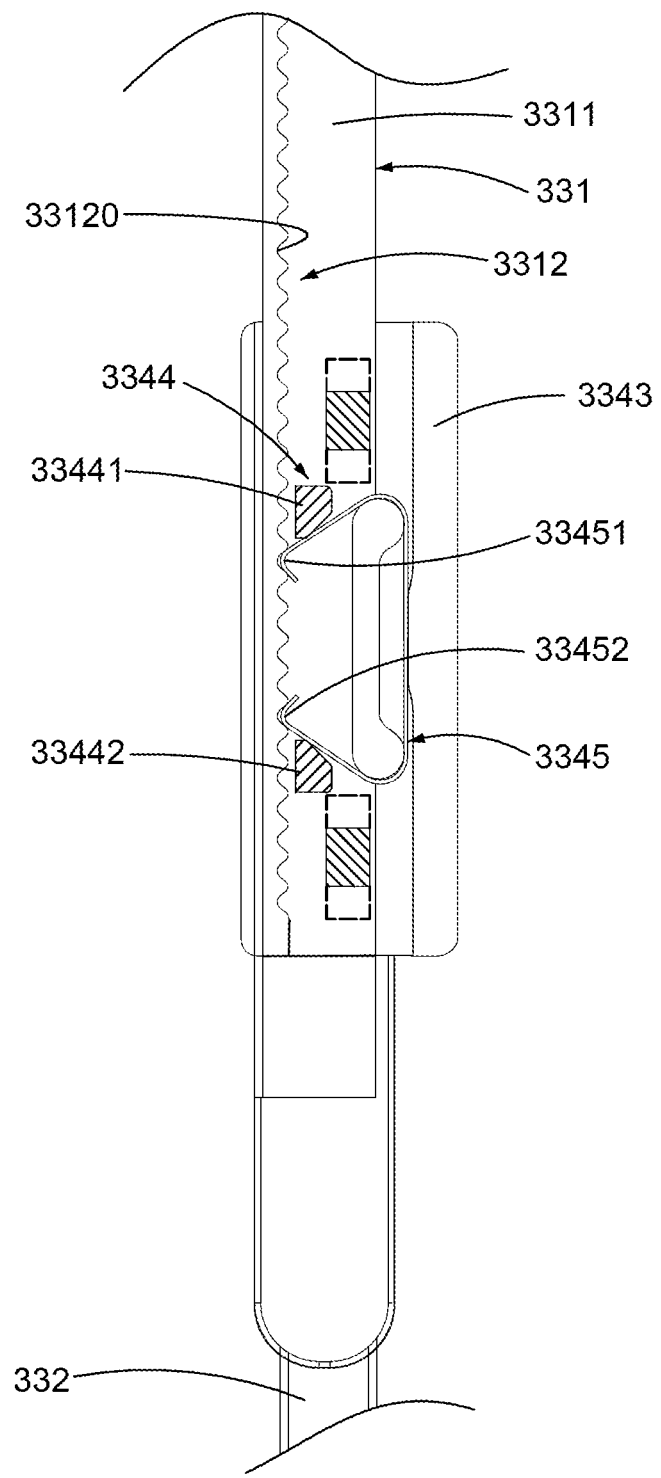
FIG. 4 is a cross-sectional showing that the elastic unit is engaged with the fixing notches to thereby connect the upper stem and the lower stem together.

Referring to FIG. 4, the elastic unit 3345 has a first end 33451 and a second end 33452 respectively formed on two opposite ends thereof. The first end 33451 and the second end 33452 are engaged with different fixing notches 33120 respectively. The engaging case 3344 has a first engaging part 33441 capable of restricting the first end 33451, and a second engaging part 33442 capable of restricting the second end 33452. In this embodiment, as shown in FIG. 2A, the engaging case 3344 has an engaging recess 33440 recessedly formed on a surface of the engaging case 3344. The operating unit 3342 has a protruding part 33420 protruding from a surface of the operating unit 3342. The protruding part 33420 is capable of being inserted into the engaging recess 33440 when the operating unit 3342 is pushed by the first spring unit 3346.

Figure 5:
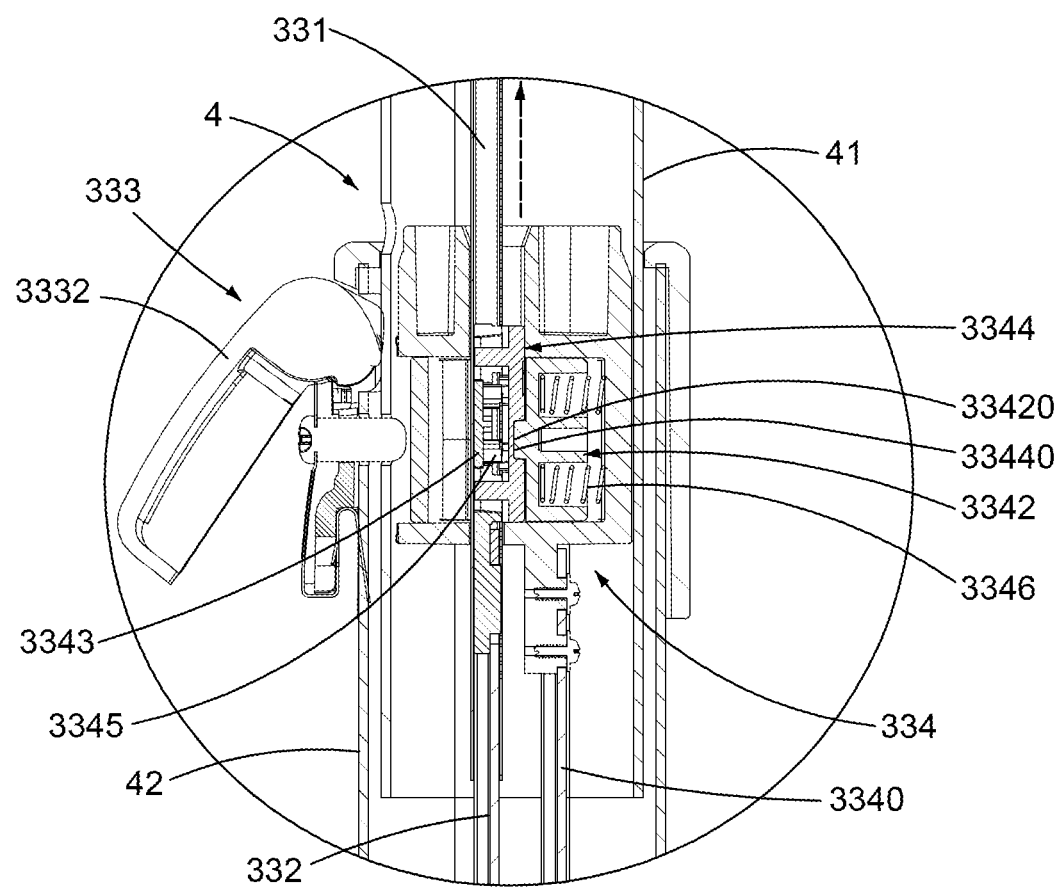
FIG. 5 is a cross-sectional showing that the locking unit is released to allow the first spring unit to push the operating unit to thereby position the engaging case and fix the lower stem.
Figure 6:
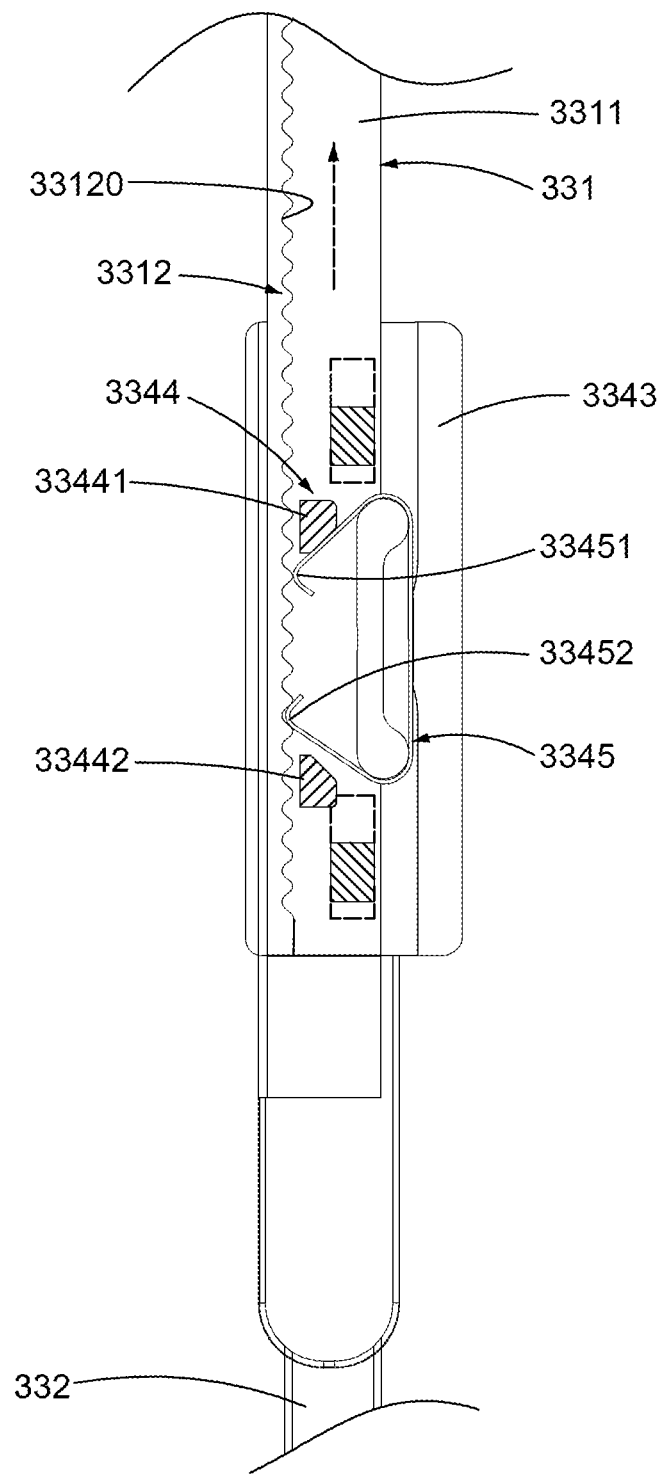
FIG. 6 is a cross-sectional showing that the first end of the elastic unit is constrained by the first engaging part of the engaging case when the upper stem is moved upwards.

Referring to FIG. 5, during executing the adjustment of the full length of the main frame 4, the locking unit 3332 is loosened to allow the first spring unit 3346 to push the operating unit 3342 to the engaging case 3344 until the protruding part 33420 of the operating unit 3342 is inserted into the engaging recess 33440 of the engaging case 3344 to thereby position the engaging case 3344 and fix the lower stem 332. After the lower stem 332 is fastened by the engagement of the engaging case 3344 and the operating unit 3342, the upper frame 41 is moved to simultaneously carry out a movement of the upper stem 331. Referring to FIG. 5 and FIG. 6, when the upper stem 331 is driven by the upper frame 41 to move upwards in order to increase the full length of the main frame 4, the upper stem 331 activates the elastic unit 3345 to move upwards synchronously owing to the engagement of the first end 33451 and the second end 33452 with the fixing notches 33120. At the same time, the first end 33451 is restricted by the first engaging part 33441 to reduce the engaging force of the elastic unit 3345 whereby the elastic unit 3345 is forced to stay at the original place, and that facilitates the upward movement of the upper stem 331. When the adjustment is finished and the upper stem 331 stops moving, the first end 33451 and the second end 33452 are engaged with another fixing notches 33120 again.

Figure 7:
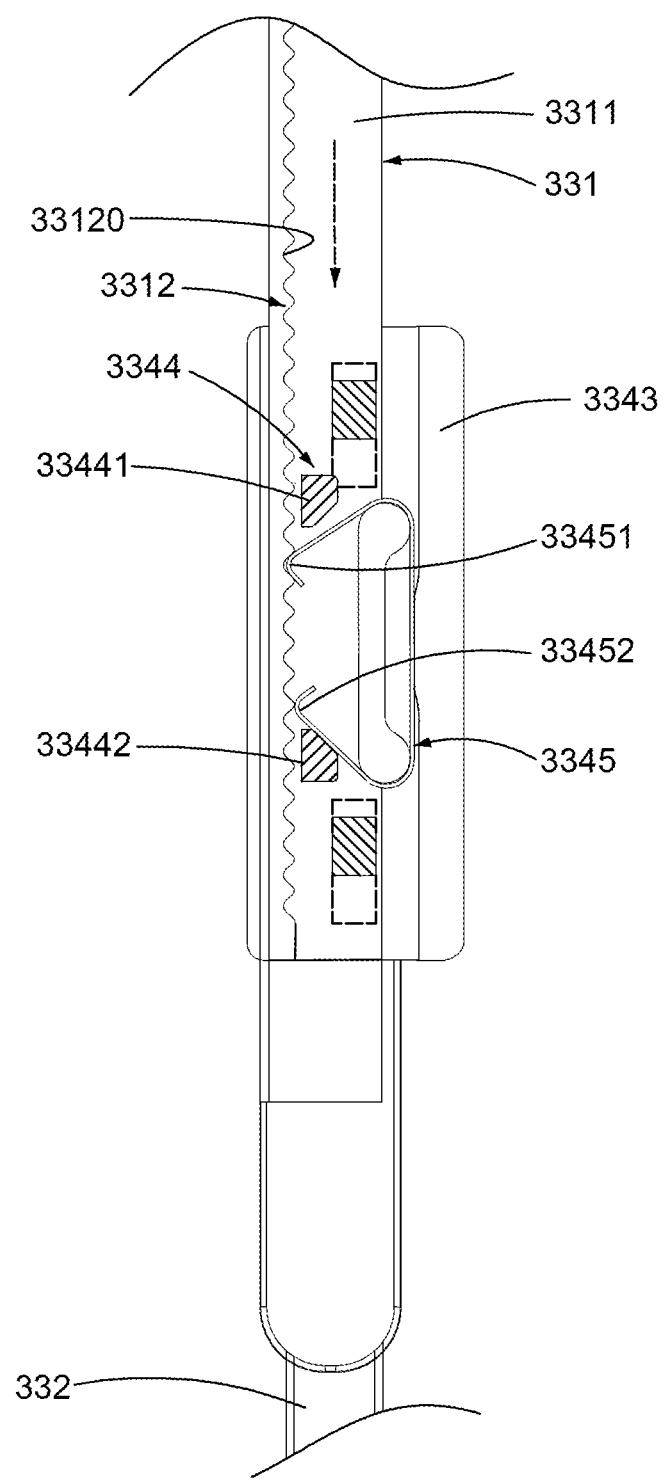
FIG. 7 is a cross-sectional showing that the second end of the elastic unit is constrained by the second engaging part of the engaging case when the upper stem is moved downwards.

On the contrary, referring to FIG. 5 and FIG. 7, when the upper stem 331 is driven by the upper frame 41 to move downwards in order to reduce the full length of the main frame 4, the upper stem 331 also activates the elastic unit 3345 to move downwards. At the same time, the second end 33452 is restricted by the second engaging part 33442 to reduce the engaging force of the elastic unit 3345 whereby the elastic unit 3345 is forced to stay at the original place, and that facilitates the downward movement of the upper stem 331. When the adjustment is finished and the upper stem 331 stops moving, the first end 33451 and the second end 33452 are engaged with another fixing notches 33120 again. Thus, the quick adjustment of the full length of the main frame 4 is attained and the convenience of use is increased effectively.

Figure 8:
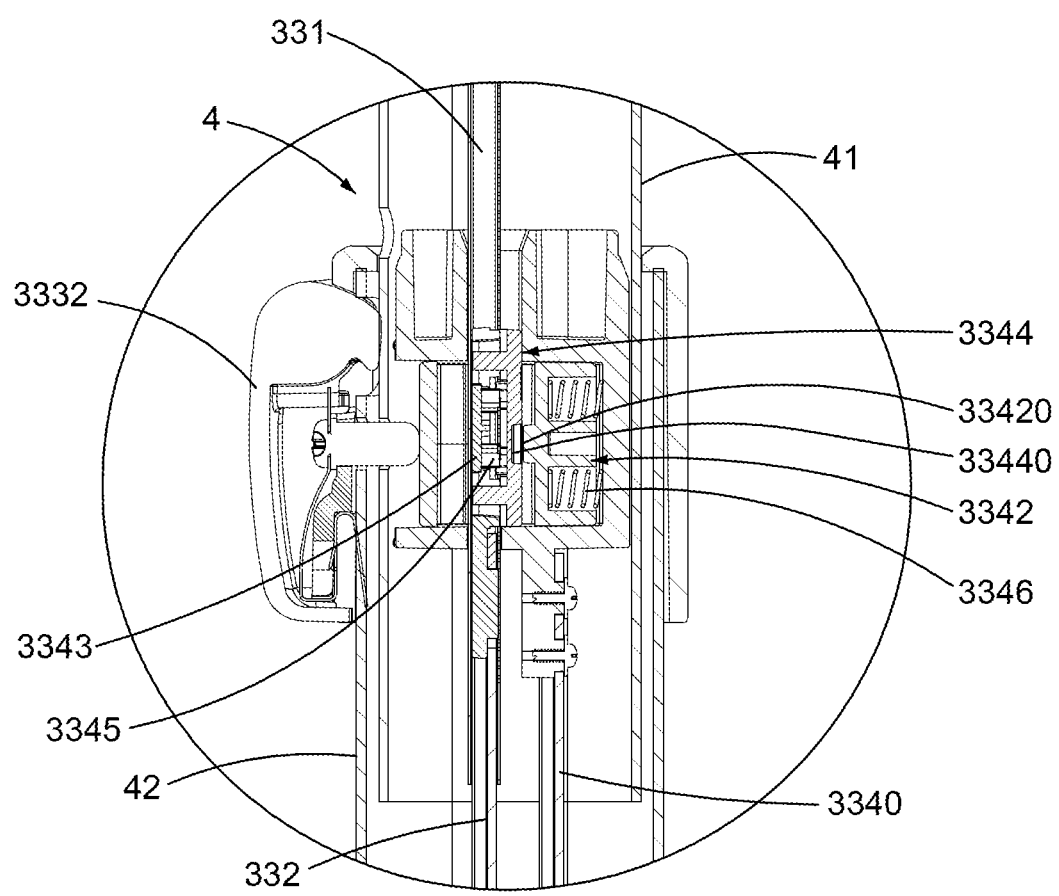
FIG. 8 is a cross-sectional showing that the locking unit is fastened to push the operating unit and release the engaging case whereby the lower stem is movable with a movement of the upper stem.

Referring to FIG. 8, after the adjustment of the full length of the main frame 4 is completed, the locking unit 3332 is fastened to be inserted into the lower frame 42 and the upper frame 41 to further push the operating unit 3342 toward a direction opposite to the engaging case 3344, and therefore force the operating unit 3342 to be separated from the engaging case 3344, namely the protruding part 33420 leaves the engaging recess 33440 to release the engaging case 3344 and the lower stem 332. Thus, the lower stem 332 is movable with the movement of the upper stem 331. Hence, the upper stem 331 which is triggered by the brake handle 31 can activate the lower stem 332 synchronously to further stimulate the brake member 32 to execute a braking action.

Figures 9, 9A:
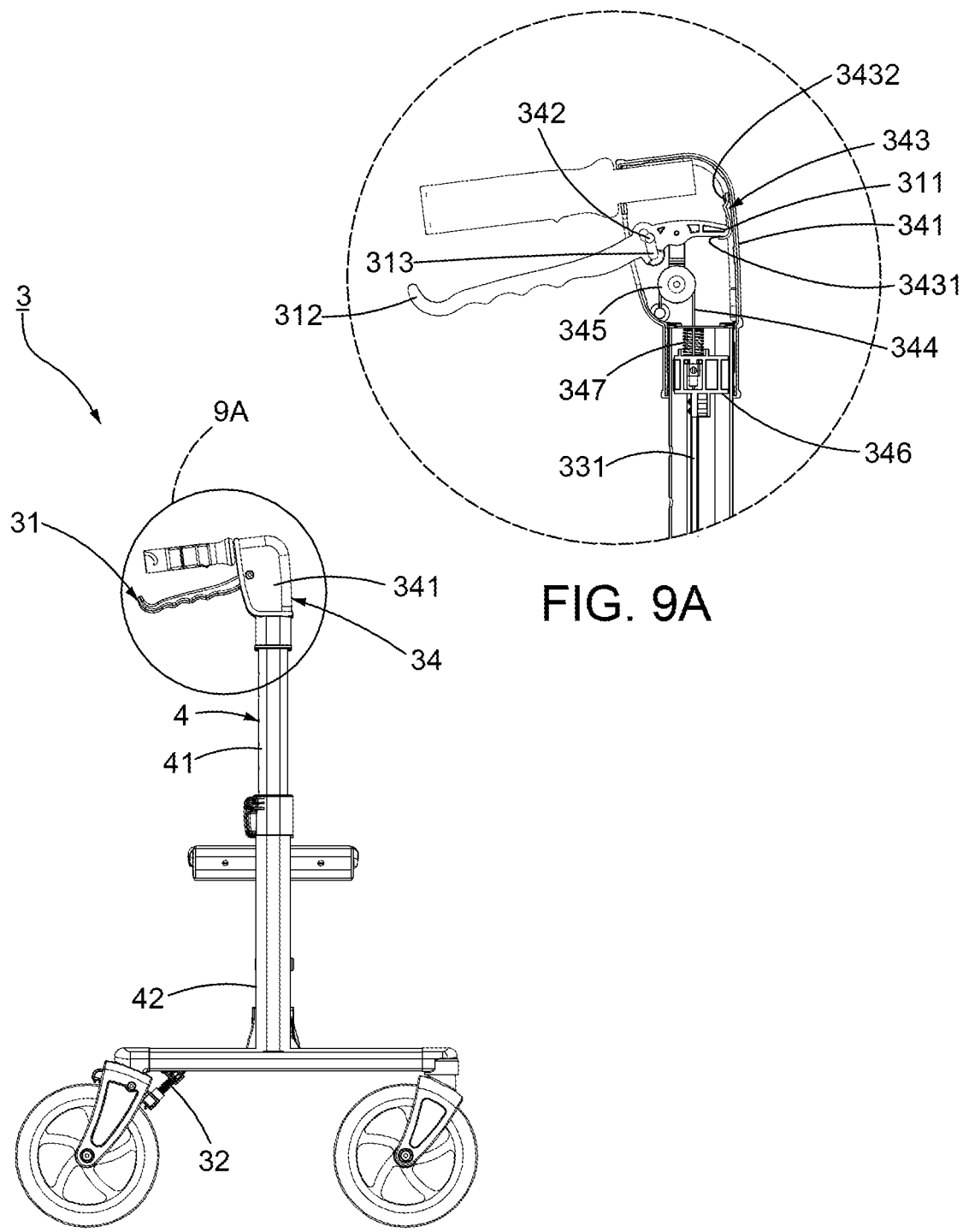
FIG. 9 is a schematic view showing a second preferred embodiment of this invention.
FIG. 9A is an enlarged view of the encircled portion 9A indicated in FIG. 9 and showing a neutral position of the brake handle.

Referring to FIG. 9 and FIG. 9A show a second preferred embodiment of a hidden braking device 3 of this invention. The correlated elements, the concatenation of elements, the operation and objectives of the second preferred embodiment are the same as those of the first preferred embodiment. This embodiment is characterised in that a brake control set 34 is disposed between the upper stem 331 and the brake handle 31. The brake handle 31 has a front end 311, a rear end 312 opposite to the front end 311, and a slot 313 formed between the front end 311 and the rear end 312. The rear end 312 is movable between a neutral position, a normal braking position, and a brake locking position. The brake control set 34 has a housing 341 fixed to the upper frame 41, a shaft 342 fixed to the housing 341 and penetrating the slot 313, a securing unit 343 disposed inside the housing 341, a connecting line 344 connected to the upper stem 331 and the housing 341 and driven by the brake handle 31, a pulley 345 disposed on the brake handle 31 and allowing the connecting line 344 to pass around and then being fixed to the housing 341 to thereby reduce the abrasion of the connecting line 344 caused during a braking action, a stem base 346 disposed on the upper stem 331 and connected to the connecting line 344, and a second spring unit 347 disposed between the stem base 346 and the housing 341. The securing unit 343 has a first limiting recess 3431 and a second limiting recess 3432 formed on two opposite ends respectively. Further, the second spring unit 347 is capable of pushing the stem base 346 toward a direction opposite to the pulley 345 in order that the connecting line 344 remains taut, thereby smoothing the braking action.

Figure 10:
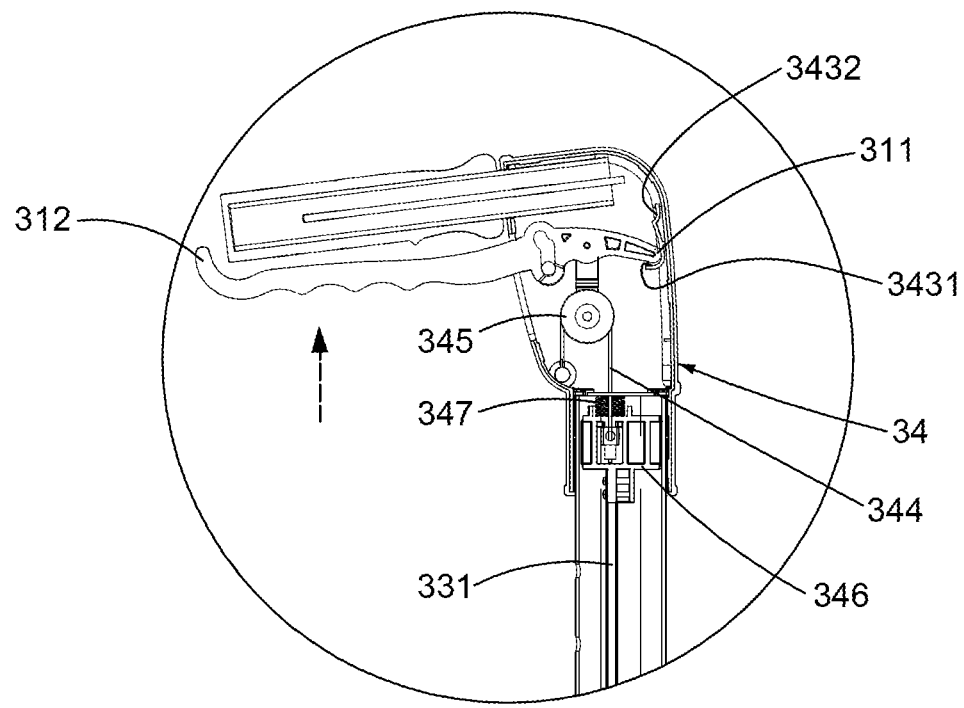
FIG. 10 is a cross-sectional view showing that the brake handle is engaged with the first limiting recess and griped to execute a normal braking action.

Referring to FIG. 9, FIG. 9A, before a normal braking action is executed, the rear end 312 is positioned at the neutral position and the front end 311 is located in the first limiting recess 3431. Referring to FIG. 10, in order to execute the normal braking action, the user grips the brake handle 31 to move the rear end 312 to the normal braking position, namely the rear end 312 moves upwards, and simultaneously the front end 311 carries out an upward movement of the pulley 345 to pull the connecting line 344 and the stem base 346 upwards whereby the upper stem 331 is also driven to move upwards so as to activate the lower stem 332 (not shown) and the brake member 32 together to execute the normal braking action. When releasing the brake handle 31, the second spring unit 347 pushes the stem base 346 toward the direction opposite to the pulley 345 to thereby tighten the connecting line 344 and move the pulley 345 downwards simultaneously whereby the rear end 312 returns to the neutral position and the normal braking action is stopped.

Figure 11:
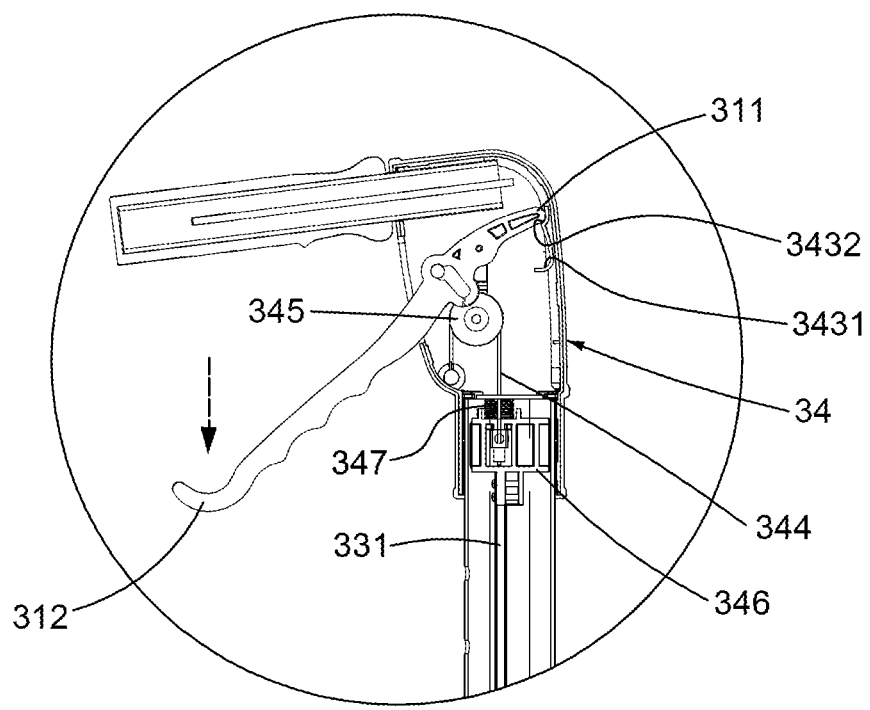
FIG. 11 is a cross-sectional view showing that the brake handle is engaged with the second limiting recess to execute an uninterrupted braking action.

Referring to FIG. 9 and FIG. 11, in order to fasten the brake handle 31 so as to execute an uninterrupted braking action, the user presses the rear end 312 downwards to position the rear end 312 at the brake locking position and simultaneously move the front end 311 from the first limiting recess 3431 to the second limiting recess 3432. The upward movement of the front end 311 moves the pulley 345 upwards and further pulls the connecting line 344, the stem base 346, the upper stem 331 and the lower stem 332 (not shown) upwards whereby the brake member 32 is then activated to attain the uninterrupted braking action. When the user loosens the brake handle 31, the braking action is still maintained because the front end 311 is positioned in the second limiting recess 3432 and that allows the rear end 312 to maintain at the brake locking position. Thus, the brake member 32 is triggered continuously, thereby attaining the uninterrupted braking action. On the contrary, when the front end 311 is moved from the second limiting recess 3432 to the first limiting recess 3431, the rear end 312 returns to the neutral position as shown in FIG. 9A, the braking action will be stopped while the user loosens the brake handle 31. Therefore, the uninterrupted braking action can be applied or stopped by engaging the front end 311 with the second limiting recess 3432 or the first limiting recess 3431, thereby attaining an effect of multiple use.

To sum up, the hidden braking device of this invention takes advantages of the locking set and the adjusting set to adjust the full length of the main frame quickly. When loosening the locking unit, the first spring unit pushes the operating unit to allow the operating unit to position the engaging case and further fasten the lower stem. And then, the upper frame is adjusted to move the upper stem simultaneously. When the upper stem is moved, the elastic unit is constrained by the engaging case so as to reduce the engaging force of the elastic unit, and that facilitates the movement of the upper stem, thereby attaining the quick adjustment of the full length of the main frame and increasing the convenience of use. Moreover, the brake control set is adapted to change the braking action into the normal braking action or the uninterrupted braking action by situating the front end in the first limiting recess or the second limiting recess, thereby attaining the effect of multiple use.

While the embodiments of this invention are shown and described, it is understood that further variations and modifications may be made without departing from the scope of this invention.

What is claimed is:

1. A hidden braking device comprising a brake handle, a brake member adapted to control a rotation of a wheel set, a connecting member connected to said brake handle and said brake member, and a main frame disposed between said brake handle and said wheel set, wherein said connecting member is disposed inside said main frame, said main frame including a lower frame and an upper frame sliding relative to said lower frame to attain an adjustment of a full length of said main frame, wherein said connecting member includes an upper stem connected to said brake handle, a lower stem connected to said brake member, a locking set disposed on an end of said lower frame where said upper frame is inserted, and an adjusting set connected to said upper stem and said lower stem, said upper stem including a sliding trough adapted for an insertion of said lower stem and a fixing trough with a plurality of fixing notches formed on a surface of said sliding trough, said locking set including a locking body disposed on said end of said lower frame, and a locking unit pivotally connected to said locking body and capable of triggering a movement of an operating unit of said adjusting set, said adjusting set including a fixing rod disposed on said lower frame, a main base fixed to said fixing rod, said operating unit movably disposed inside said main base and adapted for insertions of said upper stem and said lower stem, a positioning case connected to said lower stem and located in said operating unit, an engaging case disposed relative to said positioning case, an elastic unit disposed between said positioning case and said engaging case and having a first end and a second end engaged with different ones of said plurality of fixing notches, and a first spring unit disposed on said operating unit and capable of pushing said operating unit to said engaging case to thereby position said engaging case, said engaging case including a first engaging part capable of restricting said first end of said elastic unit and a second engaging part capable of restricting said second end of said elastic unit when said main frame operates the adjustment of said full length, and further comprising an engaging recess recessedly formed on a surface of said engaging case and a protruding part projecting from a surface of said operating unit, said protruding part being adapted to be inserted into said engaging recess when said operating unit is pushed by said first spring unit.

2. The hidden braking device as claimed in claim 1, further comprising a brake control set disposed between said upper stem and said brake handle, said brake handle having a front end, a rear end opposite to said front end, and a slot formed between said front end and said rear end, said rear end being movable between a neutral position, a normal braking position, and a brake locking position, said brake control set including a housing fixed to said upper frame, a shaft fixed to said housing and penetrating said slot of said brake handle, a securing unit disposed inside said housing, a connecting line connected to said upper stem and said housing and driven by said brake handle, said securing unit including a first limiting recess and a second limiting recess formed above said first limiting recess, said front end of said brake handle moving from said first limiting recess to said second limiting recess when said rear end of said brake handle assumes said brake locking position.

3. The hidden braking device as claimed in claim 2, further comprising a pulley disposed on said brake handle, said connecting line passing around said pulley and then being fixed to said housing.

4. The hidden braking device as claimed in claim 2, wherein said brake control set includes a stem base disposed on said upper stem and connected to said connecting line and a second spring unit disposed between said stem base and said housing.

* * * * *